Patented May 22, 1934

1,959,679

UNITED STATES PATENT OFFICE 1,959,679

VAT DYESTUFF OF THE DIBENZOPYRENE-QUINONE SERIES

Max Albert Kunz, Mannheim, Georg Kränzlein, Frankfort-Hochst-on-the-Main, Karl Koeberle, Ludwigshafen-on-the-Rhine, Martin Corell, Frankfort-Hochst-on-the-Main, Erich Berthold, Ludwigshafen-on-the-Rhine, and Heinrich Vollmann, Frankfort-Hochst-on-the-Main, Germany, assignors to General Aniline Works, Inc., New York, N. Y., a corporation of Delaware No Drawing. Original application April 16, 1929, Serial No. 355,654. Divided and this application August 31, 1932, Serial No. 631,302. In Germany June 30, 1928

8 Claims. (Cl. 260—61)

The present invention relates to new vat dyestuffs of the dibenzopyrenequinone series and a process for their production.

It is already known that halogen can be introduced in 3.4.8.9-dibenzopyrene-5.10-quinone by means of halogens or halogenating agents with or without the aid of halogen transferrers. Some of the halogen derivatives thus obtained are themselves vat dyestuffs and others are valuable intermediate products for the manufacture of dyestuffs. All these products, however, in so far as they are dyestuffs at all, are not very suitable for dyeing purposes in practice, because they dye rather dull shades which, moreover, are not sufficiently fast. It is also known that uniform 1.6-dihalogen-3.4.8.9-dibenzopyrene-5.10-quinones are obtained by treating 1.5-dibenzoyl-2.6-dihydroxynaphthalene with phosphorous halides. The resulting dyestuffs have dyeing properties similar to those of the unsubstituted 3.4.8.9-dibenzopyrene-5.10-quinone, which, though they are valuable in many respects, do not meet all requirements of practice.

In our copending application Ser. No. 355,654 filed April 16th, 1929, of which this application is a division, we have disclosed that new products, containing halogen and having excellent dyeing properties, are obtained by treating 3.4.8.9-dibenzopyrene-5.10-quinone which initial material corresponds to the formula

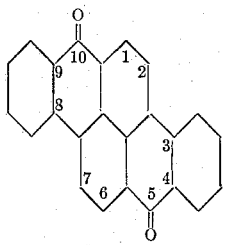

in sulphuric acid or derivatives thereof, such as fuming sulphuric acid and in particular chlorsulphonic acid, with halogens or agents supplying the same in the presence of a halogen-transferring catalyst under such conditions of working as to prevent an undue attack of the initial material and the final product. It has been found that these conditions of working depend largely on the temperature employed. The temperature may be the lower, the more reactive the halogen is; therefore, in the case of chlorine, it may be as low as 50° C., whereas in the case of bromine it will usually be about 60° C., and in the case of iodine still higher temperatures, such as 110° C. and more will be necessary. It has also been found that at higher temperatures, say at about 80° C. to 85° C. or more, the 3.4.8.9-dibenzopyrene-5.10-quinone is not entirely resistant to the action of the sulphuric acids employed, these giving rise to the formation of sulphonated products and other by-products impairing the properties of the final product. It is, however, possible to carry out the reaction at such high temperatures, provided it is completed in as short a time as possible, whereby the said action of the sulphuric acids is avoided. With this object in view, either an addition of comparatively large quantities of the halogen-transferring catalyst, such as iodine or sulphur may be made, or the halogen is rapidly introduced into the reaction mixture, or an excess thereof employed, or several of these measures may be used. It results from the foregoing that the most favorable temperature is not higher than about 80° or 85° C. in the case of bromination or chlorination; when working below the said limit, small quantities of the catalyst, for example 0.1 to 0.5 per cent by weight, calculated on the amount of the dibenzopyrene-quinone, are sufficient for the production of products dyeing clear yellow shades; if, however, products possessing the most desirable shades and the highest coloring power are to be made, it is advisable to employ considerably larger amounts of the catalyst.

Valuable products are also obtained at higher temperatures, in which case one or more of the aforesaid precautions must be taken; for instance, the amount of catalyst employed may be as high as 2, 3, 5 or still much more per cent by weight, calculated on the dibenzopyrene-quinone. It will be seen that the conditions of working are mutually interdependent; they must be so restricted as to time or temperature and so on, that no sulphonation or other undesirable change of the initial materials occurs; for the sake of simplicity of language, we shall therefore speak in the following of "restricted conditions", and it will now be understood what we mean by this term. In order to make the matter still clearer, we shall now explain our method by reference to a typical case, namely the production of dibromo-3.4.8.9-dibenzopyrene-5.10-quinone. When 3.4.8.9-dibenzopyrene-5.10-quinone is dissolved, for example in chlorsulphonic acid, and acted upon with bromine, the reaction may be carried out with 1 to 1.25 molecular proportions of bromine per each molecular proportion of the dibenzopyrene-quinone with the aid of from 2 to 10 per cent of a catalyst, such as iodine, and in the course of only a few hours at temperatures of about 80° C., a dibrominated product of highest qualities being obtained. When working at lower temperatures, such as from 60° to 70° C. a larger amount of bromine and a prolonged time of reaction, for example 20 hours or even more, is suitable. At higher temperatures of for example 85° to 100° C. the time of reaction must be reduced to a minimum, and preferably agents counteracting sulphonation, such as iodine or sulphur are added. At still higher temperatures, still more precaution is necessary. Further typical cases of the restricted conditions will be given hereinafter in the examples.

As pointed out in the foregoing, the reaction may be carried out in sulphuric acid or derivatives thereof, such as fuming sulphuric acid and in particular chlorsulphonic acid. When hereinafter we speak of "sulphuric acid solution", we wish it to be understood that this term is also to cover solutions in the derivatives of sulphuric acid. It should be noted that chlorsulphonic acid is a particularly good solvent for the purposes of our present invention. When employed at high temperatures, such as about 85° C. or above, chlorination may take place to a smaller or greater extend due to the action of the chlorsulphonic acid.

As regards the catalysts employed in our process, any of the well-known halogen-transferring catalysts may be used for this purpose, but particularly good results are obtained with such catalysts as, for example, iodine, mercury, selenium, sulphur, antimony or bismuth, and of these iodine is the most valuable catalyst. The number of halogen atoms which enter the molecule, depends on the quantity of halogen, but in some cases also the quantity and nature of the catalyst and the nature of the solvent is of importance. This fact becomes particularly evident when working with iodine as a catalyst in chlorsulphonic acid. These two agents in conjunction appear to have oxidizing properties, whereby the hydrogen halide formed during the halogenation is oxidized to free halogen. Accordingly, whereas usually in halogenations one molecule of the halogen is required for each atom of halogen to be introduced, it may be observed that with the aid of only one molecule of halogen, two halogen atoms are introduced into the dyestuff molecule as mentioned above. In other cases, a slight excess of halogen, for example 1.25 atoms may be required for introducing one halogen atom. In some cases it may be of advantage to employ two or more catalysts simultaneously or consecutively.

The chloro-3.4.8.9-dibenzopyrene-5.10-quinones obtainable according to the present invention dissolve in concentrated sulphuric acid, usually to give solutions of blue or violet color. They form vats which are usually violet or red. They are soluble with great difficulty in organic solvents of high boiling point, such as nitrobenzene, halogenbenzenes, for example mono- or trichlorbenzene, quinoline, nitronaphthalene and the like, and may be purified by crystallization therefrom or by fractional precipitation from their solutions in sulphuric acid by means of water or dilute acid. The said chloro derivatives dye more greenish yellow shades than the parent substance.

The new products obtainable according to the present invention give dyeings of extraordinary clearness from the vat. Their coloring power is substantially greater, often about twice or even more, than that of the initial material free from halogen and of the known 1.6-dihalogen-3.4.8.9-dibenzopyrene-5.10-quinone; also their properties as regards fastness are much better than those of the said known products; they are particularly distinguished by their excellent fastness to light and to boiling with solutions of soap or soda, and they also possess a very good affinity to vegetable fibre. Particularly valuable products obtainable according to the present invention are those containing from two to three chlorine atoms in the 3.4.8.9-dibenzopyrene-5.10-quinone molecule. They give particularly bright, clear dyeings, and are also very readily vatted.

Generally speaking, it is of no importance, whether crude or pure 3.4.8.9-dibenzopyrene-5.10-quinone is used as starting material, but it may in some cases be of advantage to employ a pure initial material, because in this case the final products are particularly free from impurities which might cause trouble in their application for dyeing, though as a rule the impurities are insoluble in the vats. Such impurities may, however, also be removed by purifying the products obtained from crude initial material.

The difference between, for example, the known 1.6-dichloro derivative and the dichloro derivatives obtainable according to this invention and also the difference between products obtained according to this invention under different conditions of working are probably due to the different positions of the chlorine atoms; but we dot not wish to bind ourselves to this explanation.

The constitution of the new products is not yet known with certainty, whereas the number of halogen atoms contained in the dyestuff molecule is definitely known. For this reason no formulæ of the products are given in the following examples, which will further illustrate the nature of the present invention, but to which examples our invention is not restricted. The parts are by weight.

*Example 1*

33.2 parts of 3.4.8.9-dibenzopyrene-5.10-quinone, prepared, for example, according to the U. S. Patent No. 1,564,584, are dissolved, while stirring, in 332 parts of chlorosulphonic acid, and 3 parts of iodine are added. The temperature is then slowly raised to from 65° to 70° C. and dry chlorine gas is passed in for from 1½ to 2 hours. The whole is then allowed to cool, the solution is then diluted with 150 parts of concentrated sulphuric acid, poured on ice and filtered by suction while hot. The resulting dyestuff, which is a trichlor-3.4.8.9-dibenzopyrene-5.10-quinone, is obtained in a very good yield in the form of a yellow powder. It dissolves in concentrated sulphuric acid giving a violet coloration. It crystallizes from nitrobenzene in small yellow needles and gives very strong greenish yellow dyeings of very good fastness on cotton from a violet red vat.

Example 2

33.2 parts of pure 3.4.8.9-dibenzopyrene-5.10-quinone, such as may be obtained by sublimating or crystallizing crude 3.4.8.9-dibenzopyrene-5.10-quinone or boiling it with high boiling organic solvents, are dissolved in 330 parts of chlorsulphonic acid, while stirring. After addition of 3 parts of iodine, the temperature is raised to from 60° to 65° C., and a current of dry chlorine gas is introduced, until a sample of the reaction product dissolves in concentrated sulphuric acid forming a violet solution which is the case when analysis of a sample indicates a chlorine content of 2 atomic proportions in the molecule. The whole is then allowed to cool, diluted with 200 parts of concentrated sulphuric acid, poured onto ice, and the acid paste is then boiled for a short time by introducing steam and filtered by suction. The reaction product which is obtained in an excellent yield is a dichloro-3.4.8.9-dibenzopyrene-5.10-quinone, which dyes cotton yellow shades from a reddish violet vat. A tetrachloro derivative is obtained from 3.4.8.9-dibenzopyrene-5.10 quinone in a similar manner; this product dissolves in concentrated sulphuric acid with the formation of a blue solution with a reddish tinge and, when dissolved in oleum, it gives a solution of pure color; it dyes cotton yellow shades with a greenish tinge of very good fastness from a violet vat with a reddish tinge.

Example 3

Chlorine is passed into a solution of 33.2 parts of 3.4.8.9-dibenzopyrene-5.10-quinone in 330 parts of chlorsulphonic acid to which 3 parts of iodine have been added, until the increase in weight amounts to about 11 per cent of the dibenzopyrene-quinone employed, the reaction mixture being kept at about between 60° and 70° C. The reaction mixture is worked up as usual and a monochloro derivative obtained dyeing cotton strong yellow shades from a red vat and dissolving to a violet solution in concentrated sulphuric acid.

Example 4

33.2 parts of 3.4.8.9-dibenzopyrene-5.10-quinone are dissolved in 240 parts of chlorosulphonic acid after the addition of 0.15 part of sulphur and 0.1 part of iodine. The temperature is raised to 65° C. and a dry current of chlorine is passed into the solution until a sample of the reaction product dissolves to a blue violet solution in concentrated sulphuric acid. The reaction mixture is then allowed to cool and worked up as usual. The trichloro-3.4.8.9-dibenzopyrene-5.10-quinone obtained forms a yellow paste and a yellow powder when dry and dyes cotton from a violet vat very fast yellow shades with a greenish tinge.

What we claim is:

1. 3.4.8.9 - dibenzopyrene - 5.10 - quinones containing from 2 to 4 atoms of chlorine and no other substituent which are readily vattable to form violet to red vats and dye cotton bright yellow shades of a more greenish tinge than 3.4.8.9-dibenzopyrene-5.10-quinone, dissolve in concentrated sulphuric acid with a blue to violet coloration, are difficultly soluble in organic solvents of high boiling point, and are distinguished from 3.4.8.9-dibenzopyrene-5.10-quinone and its 1.6-dichlor derivative by having a substantially greater coloring power and a substantially greater fastness to light and to boiling with solutions of soap and soda.

2. Dichloro-3.4.8.9-dibenzopyrene-5.10-quinone which dyes cotton from a reddish violet vat yellow shades of a more greenish tinge than 3.4.8.9-dibenzopyrene-5.10-quinone, dissolves in concentrated sulphuric acid with a violet coloration, and is distinguished from 3.4.8.9-dibenzopyrene-5.10-quinone and its 1.6-dichlor derivative by having a substantially greater coloring power and a substantially greater fastness to light and to boiling with solutions of soap and soda.

3. Trichloro-3.4.8.9-dibenzopyrene - 5.10-quinone which dyes cotton from a violet red vat strong yellow shades of a more greenish tinge than 3.4.8.9 - dibenzopyrene - 5.10 - quinone, dissolves in concentrated sulphuric acid with a violet coloration, and is distinguished from 3.4.8.9-dibenzopyrene-5.10-quinone and its 1.6-dichlor derivative by having a substantially greater coloring power and a substantially greater fastness to light and to boiling with solutions of soap and soda.

4. Tetrachloro-3.4.8.9-dibenzopyrene-5.10-quinone which dyes cotton from a violet vat with a reddish tinge yellow shades of a more greenish tinge than 3.4.8.9-dibenzopyrene-5.10-quinone, dissolves in concentrated sulphuric acid with a blue coloration with a reddish tinge, and is distinguished from 3.4.8.9-dibenzopyrene-5.10-quinone and its 1.6-dichlor derivative by having a substantially greater coloring power and a substantially greater fastness to light and to boiling with solutions of soap and soda.

5. The process for the production of vat dyestuffs of the dibenzopyrenequinone series, which comprises acting on 3.4.8.9-dibenzopyrene-5.10-quinone in chlorosulphonic acid with a chlorinating agent in the presence of a halogen-transferring catalyst at between about 50° and about 85° C.

6. The process for the production of vat dyestuffs of the dibenzopyrenequinone series, which comprises acting on 3.4.8.9-dibenzopyrene-5.10-quinone in chlorosulphonic acid with a chlorinating agent in the presence of iodine at between about 50° and about 85° C.

7. The process for the production of vat dyestuffs of the dibenzopyrenequinone series, which comprises acting on 3.4.8.9-dibenzopyrene-5.10-quinone in chlorosulphonic acid with chlorine in the presence of a halogen-transferring catalyst at between about 50° and about 85° C.

8. The process for the production of vat dyestuffs of the dibenzopyrenequinone series, which comprises acting on 3.4.8.9-dibenzopyrene-5.10-quinone in chlorosulphonic acid with chlorine in the presence of iodine at between about 50° and about 85° C.

MAX ALBERT KUNZ.
GEORG KRÄNZLEIN.
KARL KOEBERLE.
MARTIN CORELL.
ERICH BERTHOLD.
HEINRICH VOLLMANN.